(12) United States Patent
Shetty et al.

(10) Patent No.: US 12,475,462 B2
(45) Date of Patent: Nov. 18, 2025

(54) SYSTEM AND METHOD FOR VERIFYING SIGNATURE WHEN AUTHENTICATING CARD-BASED TRANSACTION

(71) Applicant: Mastercard International Incorporated, Purchase, NY (US)

(72) Inventors: Kaushal Naveen Shetty, Thane (IN); Sachin Kumar Singh, Pune (IN); Venkata Satya Sivajee Pinnamaneni, Dardenne Prairie, MO (US)

(73) Assignee: Mastercard International Incorporated, Purchase, NY (US)

( * ) Notice: Subject to any disclaimer, the term of this patent is extended or adjusted under 35 U.S.C. 154(b) by 188 days.

(21) Appl. No.: 18/364,628

(22) Filed: Aug. 3, 2023

(65) Prior Publication Data
US 2025/0045750 A1  Feb. 6, 2025

(51) Int. Cl.
*G06Q 20/40* (2012.01)
*G06Q 20/20* (2012.01)
*G06Q 20/34* (2012.01)

(52) U.S. Cl.
CPC ......... *G06Q 20/401* (2013.01); *G06Q 20/204* (2013.01); *G06Q 20/34* (2013.01)

(58) Field of Classification Search
CPC ..... G06Q 20/401; G06Q 20/204; G06Q 20/34
See application file for complete search history.

(56) References Cited

U.S. PATENT DOCUMENTS

| | | |
|---|---|---|
| 3,983,535 A | 9/1976 | Herbst et al. |
| 4,028,674 A | 6/1977 | Chuang |
| 4,128,829 A | 12/1978 | Herbst et al. |

(Continued)

FOREIGN PATENT DOCUMENTS

| | | |
|---|---|---|
| EP | 1221127 | 10/2002 |
| FR | 2678407 | 12/1992 |

OTHER PUBLICATIONS

Article entitled "Machine Learning for Signature Verification" by Harish Srinivasan et al. In P. K. Kalra & S. Peleg, S., (Eds.), Computer Vision, Graphics and Image Processing. Lecture Notes in Computer Science, vol. 4338, pp. 761-775. Berlin, Germany: Springer. Available at: https://cedar.buffalo.edu/~srihari/papers/ICGVIP2006-sig.pdf. (2006).

*Primary Examiner* — Raven E Yono
(74) *Attorney, Agent, or Firm* — Hovey Williams, LLP (57) ABSTRACT

A system and method for verifying a signature in real-time when authenticating a card-based transaction. Initially, a digital reference signature is captured on a mobile device, sent in hashed form to a rules engine, and evaluated for features such as length, time, orientation, area, and pressure changes. Subsequently, a digital transaction signature is captured on a POS terminal, sent in hashed form to the rules engine via an acquirer, and evaluated for the same features. The rules engine compares the features of the signatures. If the transaction signature is verified, the rules engine sends an authentication token to the acquirer, and the acquirer sends the token and an authorization request to an issuer. If not, the acquirer sends a denial message to the merchant. If the power level of the POS terminal is insufficient to properly capture the transaction signature for effective evaluation, then an alternative authentication method is used.

17 Claims, 4 Drawing Sheets

(56) References Cited

U.S. PATENT DOCUMENTS

| | | | |
|---|---|---|---|
| 5,111,512 A | 5/1992 | Fan et al. | |
| 5,680,470 A | 10/1997 | Moussa et al. | |
| 10,043,056 B1* | 8/2018 | Danyluk | G06V 40/376 |
| 2002/0006214 A1* | 1/2002 | Karlsson | G06V 40/30 |
| | | | 382/119 |
| 2017/0046560 A1* | 2/2017 | Tsur | G06Q 20/325 |
| 2017/0213215 A1* | 7/2017 | Lee | G06Q 20/387 |
| 2018/0137551 A1* | 5/2018 | Zheng | G06F 18/214 |
| 2024/0242193 A1* | 7/2024 | Steiner | G06V 10/82 |

\* cited by examiner

SYSTEM AND METHOD FOR VERIFYING SIGNATURE WHEN AUTHENTICATING CARD-BASED TRANSACTION

FIELD

The present invention relates to system and methods for authenticating transactions, and more particularly, embodiments concern a system and method for verifying a signature in real-time when authenticating a point-of-sale card-based transaction.

BACKGROUND

Some transactions require users to enter personal identification numbers (PINs) as part of an identity authentication process. However, PINs can be difficult to remember and they can be difficult to enter correctly, especially for handicapped persons and on new point-of-sale (POS) screens that jumble the numbers. It is also known to verify signatures through a letter-by-letter comparison of a current signature to a prior signature. However, this process requires a significant amount of time and expertise and so is limited in its usefulness.

This background discussion is intended to provide information related to the present invention which is not necessarily prior art.

SUMMARY

Embodiments address the above-identified problems and limitations in the prior art by providing a system and method for verifying a user's transaction signature in real-time when authenticating a POS card-based transaction.

In a first embodiment, a system is provided for verifying a signature in real-time when authenticating a POS card-based transaction. The system may include a mobile device, a rules engine, a POS terminal, an acquirer, and an issuer. The mobile device may include a touchscreen configured to capture a digital reference signature of a user. The rules engine may be configured to receive the reference signature from the mobile device and to evaluate one or more features of the reference signature. The POS terminal may be associated with a merchant and include a touchscreen configured to capture a digital transaction signature of the user. The acquirer may be configured to receive the transaction signature from the POS terminal. The rules engine may be configured to receive the transaction signature from the acquirer and to evaluate the one or more features of the transaction signature. The rules engine may be configured to verify the transaction signature by comparing the features of the reference signature to the features of the transaction signature, and to send an authentication token to the acquirer once the transaction signature is verified. The acquirer may be configured to send the authentication token with an authorization request to an issuer.

Various implementation of the first embodiment may include any one or more of the following features. The system may further include software on the POS terminal to determining whether a power level of the POS terminal is sufficient to properly capture the transaction signature of the user on the touchscreen so that the features of the transaction signature can be effectively evaluated by the rules engine. The features may include a length feature, a time feature, an orientation feature, and an area feature. The length feature may be based on a distance of a start point and an end point of a movement of a finger of the user when creating the reference signature and the transaction signature. The time feature may be based on a time spent creating the reference signature and the transaction signature. The orientation feature may be based on a physical orientation relative to gravity as well as a translational motion when creating the reference signature and the transaction signature. The area feature may be based on a surface area covered by the reference signature and the transaction signature. The features may further include a pressure change feature based on changes in a pressure by the user when creating the reference signature and the transaction signature. The reference signature and the transaction may be sent to and received by the rules engine in a hashed form. The rules engine may store data for the features of the reference signature in a signature vault for subsequent retrieval and use in verifying the transaction signature. The rules engine assigns an acceptable range to each feature of the one or more features, and the digital transaction signature is verified when each feature of the one or more features of the digital transaction signature is within the acceptable range of the same feature of the digital reference signature.

In a second embodiment, a method is provided for verifying a signature in real-time when authenticating a POS card-based transaction. The method may include the following steps. A digital reference signature of a user may be captured on a touchscreen of a mobile device of the user. The reference signature may be sent from the mobile device to a rules engine. One or more features of the reference signature may be evaluated by the rules engine. A digital transaction signature of the user may be captured on a touchscreen of a POS terminal. The transaction signature may be sent from the POS terminal to an acquirer. The transaction signature may be sent from the acquirer to the rules engine. One or more features of the transaction signature may be evaluated by the rules engine. The transaction signature may be verified by the rules engine by comparing the features of the reference signature to the features of the transaction signature by the rules engine. An authentication token may be sent from the rules engine to the acquirer once the transaction signature is verified by the rules engine, and the authentication token may sent from the acquirer with an authorization request to an issuer.

Various implementation of the first embodiment may include any one or more of the following features. The method may further including determining whether a power level of the POS terminal is sufficient to properly capture the transaction signature of the user on the touchscreen so that the features of the transaction signature can be effectively evaluated by the rules engine. The features may include a length feature, a time feature, an orientation feature, and an area feature. The length feature may be based on a distance of a start point and an end point of a movement of a finger of the user when creating the reference signature and the transaction signature. The time feature may be based on a time spent creating the reference signature and the transaction signature. The orientation feature may be based on a physical orientation relative to gravity as well as a translational motion when creating the reference signature and the transaction signature. The area feature may be based on a surface area covered by the reference signature and the transaction signature. The features may further include a pressure change feature based on changes in a pressure by the user when creating the reference signature and the transaction signature. The reference signature and the transaction may be sent to and received by the rules engine in a hashed form. The method may further include assigning an acceptable range to each feature of the one or more features, and the digital transaction signature is verified when each feature of the one or more features of the digital transaction signature is within the acceptable range of the same feature of the digital reference signature. The method further including storing the reference signature in a signature vault for subsequent retrieval and use in verifying the transaction signature by the rules engine.

This summary is not intended to identify essential features of the present invention, and is not intended to be used to limit the scope of the claims. These and other aspects of the present invention are described below in greater detail.

DRAWINGS

Embodiments of the present invention are described in detail below with reference to the attached drawing figures, wherein.

The figures are not intended to limit the present invention to the specific embodiments they depict. The drawings are not necessarily to scale.

DETAILED DESCRIPTION

The following detailed description of embodiments of the invention references the accompanying figures. The embodiments are intended to describe aspects of the invention in sufficient detail to enable those with ordinary skill in the art to practice the invention. Other embodiments may be utilized and changes may be made without departing from the scope of the claims. The following description is, therefore, not limiting. The scope of the present invention is defined only by the appended claims, along with the full scope of equivalents to which such claims are entitled.

In this description, references to "one embodiment," "an embodiment," or "embodiments" mean that the feature or features referred to are included in at least one embodiment of the invention. Separate references to "one embodiment," "an embodiment," or "embodiments" in this description do not necessarily refer to the same embodiment and are not mutually exclusive unless so stated. Specifically, a feature, structure, act, etc. described in one embodiment may also be included in other embodiments, but is not necessarily included. Thus, particular implementations of the present invention can include a variety of combinations and/or integrations of the embodiments described herein.

Broadly, embodiments provide a system and method for verifying a signature in real-time when authenticating a point-of-sale card-based transaction. Initially, a digital reference signature may be captured on a touchscreen of a mobile device, sent in hashed form to a rules engine, and evaluated for one or more features which may include length, time, orientation, area, and/or pressure changes on the touchscreen as the signature is created. Subsequently, a digital transaction signature may be captured on a touchscreen of a POS terminal of a merchant during the card-based transaction, sent in hashed form to the rules engine via an acquirer, and evaluated for the same one or more features. The rules engine may compare the features of the signatures. If the digital transaction signature is verified, the rules engine may send an authentication token to the acquirer, and the acquirer may send the authentication token and an authorization request to an issuer. If the digital transaction signature is not verified, the acquirer may send a denial message to the merchant. If the power level (e.g., battery charge) of the POS terminal is insufficient to properly capture the transaction signature for effective evaluation, then an alternative authentication method may be used (e.g., entry of a PIN by the user).

Figure 1:
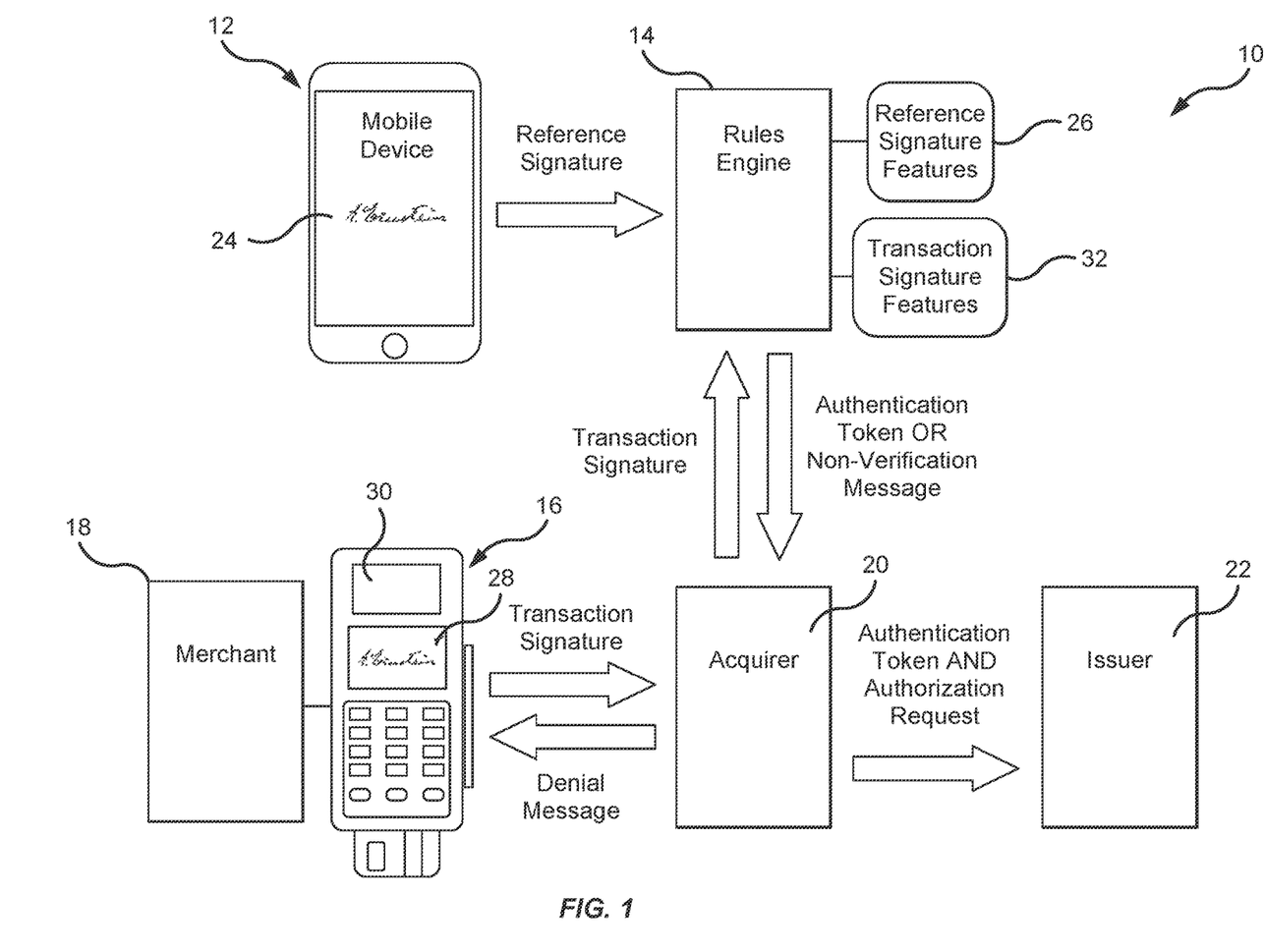
FIG. 1 is a block diagram of an embodiment of a system for verifying a signature in real-time when authenticating a POS card-based transaction.

Referring to FIG. 1, an embodiment of a system 10 for verifying a signature in real-time when authenticating a POS card-based transaction may include a mobile device 12, a rules engine 14, a POS terminal 16, a merchant 18, an acquirer 20, and an issuer 22. In one implementation, the function of the system 10 may be characterized by the steps of the method 110 described below. The mobile device 12 may include a touchscreen 24 configured to capture a digital reference signature of a user. The mobile device 12 may be configured to send (via, e.g., a wired or wireless communication network) the captured digital reference signature to the rules engine 14.

Figure 2:
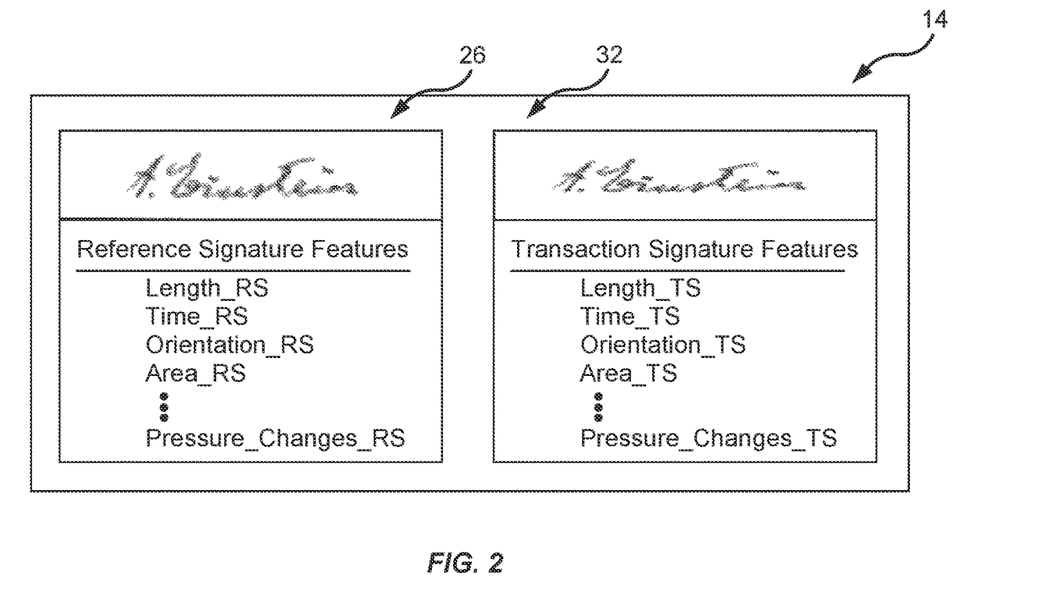
FIG. 2 is a depiction of a set of features for a digital reference signature and a set of features for a digital transaction signature as determined by a rules engine component of the system of FIG. 1, wherein the two feature sets are compared by the rules engine component to verify the digital transaction signature.

The rules engine 14 may be configured to receive the captured digital reference signature and to evaluate one or more features of the received digital reference signature. In one implementation, only a hashed version of the digital reference signature is sent to, received by, and evaluated by the rules engine 14. As seen in FIG. 2, the one or more features 26 of the digital reference signature may include a length feature (Length_RS), a time feature (Time_RS), an orientation (Orientation_RS), and/or an area (Area_RS) of the signature. In one implementation, the one or more features may further include one or more changes in pressure (Pressure_Changes_RS) on the touchscreen 24 by the user as the user creates the signature. The length feature may be based on a distance between a start point and an end point of a movement of the user's finger as they create the signature. The time feature may be based on a time spent creating the signature on the touchscreen. The orientation feature may be based on a physical orientation relative to gravity as well as translational motion, as detected by accelerometer sensors in the mobile device 12 and POS terminal 16. The area feature may be based on a surface area of the touchscreen covered by the signature. The rules engine 14 may employ an artificial intelligence technology to evaluate the features 26. The evaluation data for the features 26 of the digital reference signature may be converted to or associated with a secure token by the rules engine 14 and stored in a signature vault for subsequent retrieval and use in verifying the digital transaction signature.

The POS terminal 16 may be associated with the merchant 18 and may include a touchscreen 28 configured to capture a digital transaction signature of the user. In one implementation, software 30 on the POS terminal 16 may determine whether the power level (e.g., battery charge) of the POS terminal 16 is sufficient to properly capture the digital transaction signature of the user on the touchscreen 28 so that the one or more features of the digital transaction signature can be effectively evaluated by the rules engine 14, and if not, the software 30 may cause the POS terminal 16 to resort to an alternative authentication method (e.g., entry of a PIN by the user). The POS terminal 16 may be configured to send (via, e.g., a wired or wireless communication network) the captured digital transaction signature to the acquirer 20.

The acquirer 18 may be configured to receive the captured digital transaction signature from the POS terminal 16, and to send the received digital transaction signature to the rules engine 14. In one implementation, only a hashed version of the digital transaction signature is sent to and received by the acquirer 18.

The rules engine 14 may be configured to receive the digital transaction signature from the acquirer 18 and to evaluate one or more features of the digital transaction signature. In one implementation, only a hashed version of the digital transaction signature is sent to, received by, and evaluated by the rules engine 14. Referring again to FIG. 2, the one or more features 32 of the digital transaction signature may be at least the same features evaluated for the digital reference signature, including a length feature (Length_TS), a time feature (Time_TS), an orientation (Orientation_TS), and/or an area (Area_TS) of the signature. In one implementation, the one or more features may further include one or more changes in pressure (Pressure_Changes_TS) on the touchscreen 28 by the user as the user creates the signature. In one implementation, the rules engine 14 may further receive and evaluate electrode signals from the touchscreen 28 of the POS terminal 16 to determine whether the digital transaction signature was created by a finger or an object (e.g., a stylus), which may affect the evaluation of some features. The rules engine 14 may employ an artificial intelligence technology to evaluate the features 32. The evaluation data for the features 32 of the transaction signature may be used to further train the artificial intelligence technology to better recognize variations in the user's signature over time.

The rules engine 14 may be further configured to verify the digital transaction signature by comparing the one or more features 26 of the digital reference signature to the one or more features 32 of the digital transaction signature. Understanding that the digital transaction signature may not be perfectly identical to the digital reference signature, the rules engine 14 may assign acceptable ranges to some or all of these features, and a comparison of any particular feature of the digital transaction signature may be deemed acceptable if the feature falls within the acceptable range of the same feature of the digital reference signature. For example, acceptable ranges for some or all of the features may be differences of between zero (0) and five (5) percent, or between five (5) and ten (10) percent. The digital transaction signature may be deemed verified when each feature of the one or more features of the digital transaction signature is within the acceptable range of the same feature of the digital reference signature.

If the rules engine 14 does successfully verify the digital transaction signature, the rules engine 14 may send an authentication token to the acquirer 20. The acquirer 20 may be configured to receive the authentication token from the rules engine 14 and to send the authentication token with an authorization request to the issuer 24. If the rules engine 14 does not successfully verify the digital transaction signature, the rules engine 14 may send a non-verification message to the acquirer 20. The acquirer 20 may receive the non-verification message from the rules engine 14 and, based thereon, send a denial message to the merchant 18.

Figure 3A:
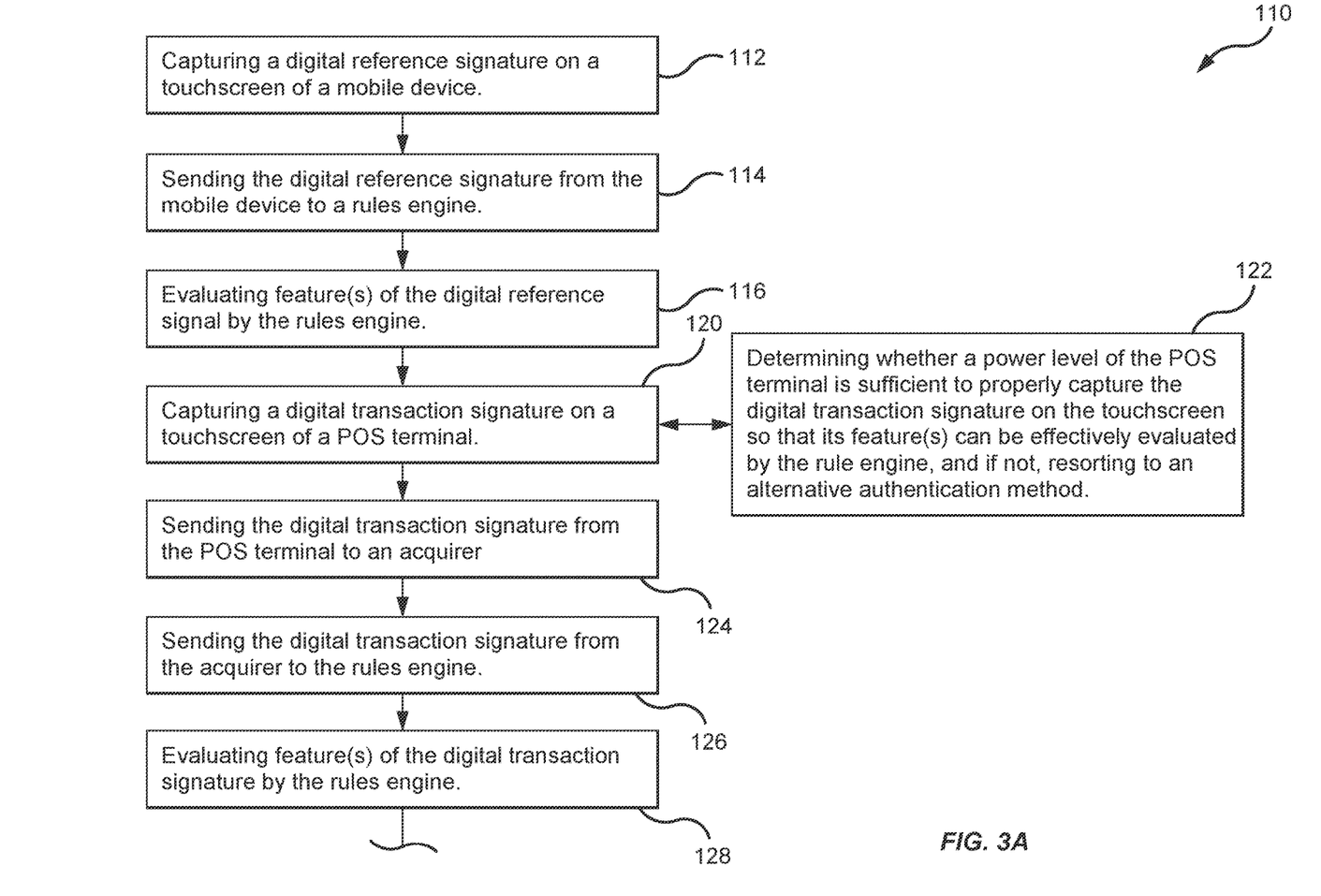
FIG. 3A is a first portion of a flowchart of an embodiment of a method for verifying a signature in real-time when authenticating a POS transaction.
Figure 3B:
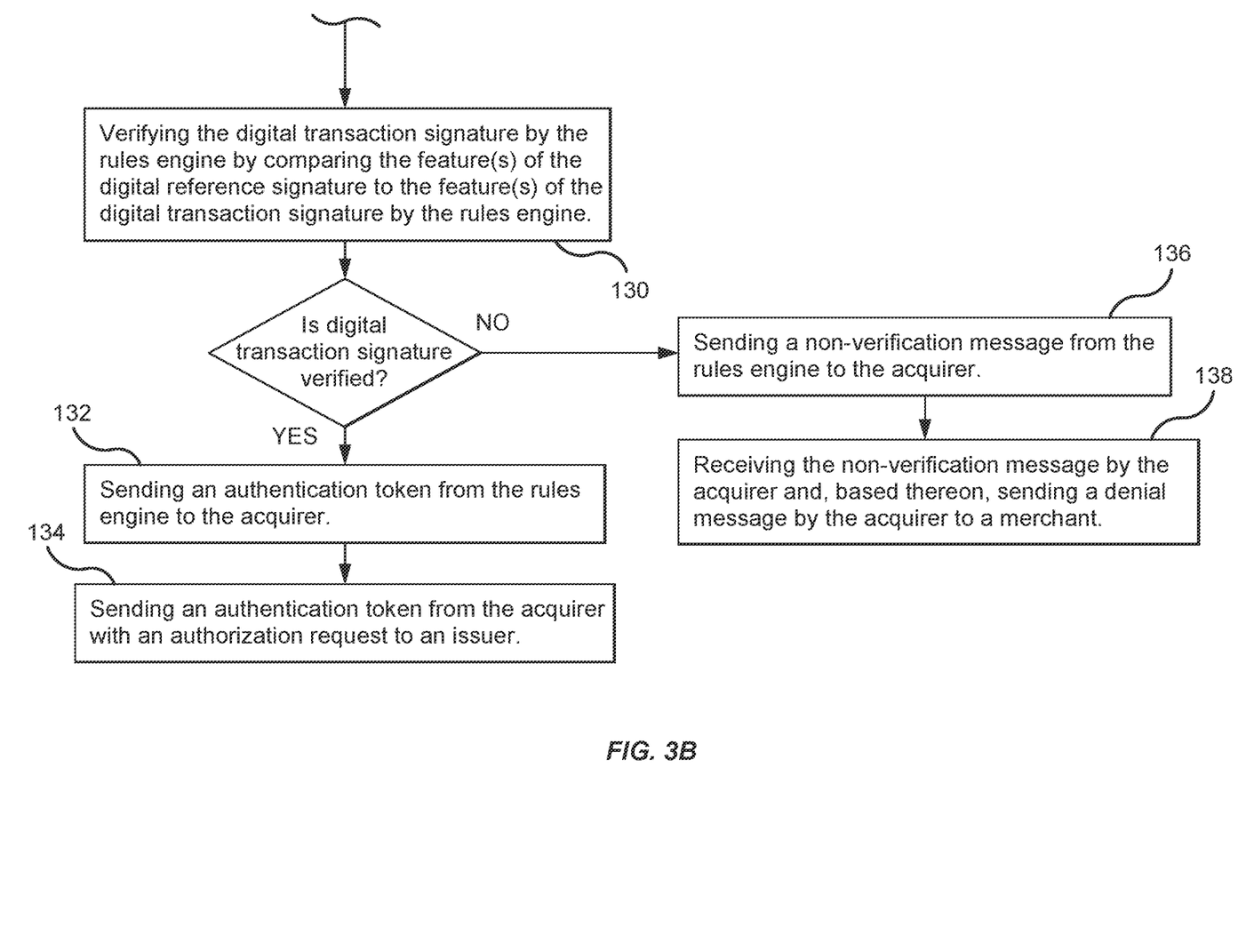
FIG. 3B is a second portion of the flowchart of the embodiment of the method for verifying the signature in real-time when authenticating the POS transaction.

Referring to FIGS. 3A and 3B, an embodiment of a method 110 for verifying a signature in real-time when authenticating a POS card-based transaction may include the following steps. In one implementation, the method 110 may be implemented by and reflect the functioning of the system 10 described above.

Initially, a digital reference signature of a user may be captured on a touchscreen 24 of a mobile device 12 of the user, as shown in 112. The captured digital reference signature may be sent from the mobile device 12 to a rules engine 14, as shown in 114. One or more features 26 of the digital reference signature may be received and evaluated by the rules engine 14, as shown in 116. In one implementation, only a hashed version of the digital reference signature is sent to, received by, and evaluated by the rules engine 14. As seen in FIG. 2, the one or more features 26 of the digital reference signature may include a length feature (Length_RS), a time feature (Time_RS), an orientation (Orientation_RS), and/or an area (Area_RS) of the signature. In one implementation, the one or more features may further include one or more changes in pressure (Pressure_Changes_RS) on the touchscreen 24 by the user as the user creates the signature. The length feature may be based on a distance between a start point and an end point of a movement of the user's finger as they create the signature. The time feature may be based on a time spent creating the signature on the touchscreen. The orientation feature may be based on a physical orientation relative to gravity as well as translational motion, as detected by accelerometer sensors in the mobile device 12 and POS terminal 16. The area feature may be based on a surface area of the touchscreen covered by the signature. The rules engine 14 may employ an artificial intelligence technology to evaluate the features 26. The evaluation data for the features 26 of the digital reference signature may be converted to or associated with a secure token by the rules engine 14 and stored in a signature vault for subsequent retrieval and use in verifying the digital transaction signature.

Subsequently, a digital transaction signature of the user may be captured on a touchscreen 28 of a POS terminal 16 of a merchant 18, as shown in 120. In one implementation, software 30 on the POS terminal 16 may determine whether the power level (e.g., battery charge) of the POS terminal 16 is sufficient to properly capture the digital transaction signature of the user on the touchscreen 28 so that the one or more features of the digital transaction signature can be effectively evaluated by the rules engine 14, and if not, the software 30 may cause the POS terminal 16 to resort to an alternative authentication method (e.g., entry of a PIN by the user), as shown in 122.

The digital transaction signature may be sent from the POS terminal 16 to an acquirer 20, as shown in 124. In one implementation, only a hashed version of the digital transaction signature is sent to and received by the acquirer 20.

The digital transaction signature may be received by the acquirer 20 and sent from the acquirer 20 to the rules engine 14, as shown in 126. In one implementation, only a hashed version of the digital transaction signature is sent to, received by, and evaluated by the rules engine 14. One or more features 32 of the digital transaction signature may be evaluated by the rules engine 14, as shown in 128. Referring again to FIG. 2, the one or more features 32 of the digital transaction signature may be at least the same features 26 evaluated for the digital reference signature, including a length feature (Length_TS), a time feature (Time_TS), an orientation (Orientation_TS), and/or an area (Area_TS) of the signature. In one implementation, the one or more features may further include a pressure change (Pressure_Changes_TS) on the touchscreen 28 by the user as the user creates the signature. In one implementation, the rules engine 14 may further receive and evaluate electrode signals from the touchscreen 28 of the POS terminal 16 to determine whether the digital transaction signature was created by a finger or an object (e.g., a stylus), which may affect the evaluation of some features. The rules engine 14 may employ an artificial intelligence technology to evaluate the features 32. The evaluation data for the features 32 of the transaction signature may be used to further train the artificial intelligence technology to better recognize variations in the user's signature over time.

The digital transaction signature may be verified by the rules engine 14 by comparing the one or more features 26 of the digital reference signature to the one or more features 32 of the digital transaction signature, as shown in 130. Understanding that the digital transaction signature may not be perfectly identical to the digital reference signature, the rules engine 14 may assign acceptable ranges to some or all of these features, and a comparison of any particular feature of the digital transaction signature may be deemed acceptable if the feature falls within the acceptable range of the same feature of the digital reference signature. For example, acceptable ranges for some or all of the features may be differences of between zero and five percent, or between five and ten percent.

If the digital transaction signature is successfully verified by the rules engine 14, an authentication token may be sent from the rules engine 14 to the acquirer 20, as shown in 132. The authentication token may be received by the acquirer 20 and sent from the acquirer 20 with an authorization request to an issuer 22, as shown in 134. If the digital transaction signature is not verified by the rules engine 14, a non-verification message may be sent from the rules engine 14 to the acquirer 20, as shown in 136. The non-verification message may be received by the acquirer 20 and, based thereon, a denial message may be sent by the acquirer 20 to the merchant 18, as shown in 138.

Although the invention has been described with reference to the one or more embodiments illustrated in the figures, it is understood that equivalents may be employed and substitutions made herein without departing from the scope of the invention as recited in the claims.

Having thus described one or more embodiments of the invention, what is claimed as new and desired to be protected by Letters Patent includes the following:

1. A system for verifying a signature in real-time when authenticating a point-of-sale card-based transaction, the system comprising:
a mobile device including a touchscreen configured to capture a digital reference signature of a user;
a rules engine configured to receive the digital reference signature from the mobile device and evaluate one or more features of the digital reference signature;
a point-of-sale terminal associated with a merchant and including a touchscreen, the point-of-sale terminal being configured to determine that a power level of the point-of-sale terminal is sufficient to capture a digital transaction signature of the user on the touchscreen so that one or more features of the digital transaction signature can be evaluated by the rules engine, and when the power level is not sufficient then initiate an alternative authentication method involving the user providing a personal identification number, and when the power level is sufficient then capture the digital transaction signature of the user;
an acquirer configured to receive the digital transaction signature from the point-of-sale terminal;
the rules engine configured to receive the digital transaction signature from the acquirer and evaluate the one or more features of the digital transaction signature;
the rules engine configured to verify the digital transaction signature by comparing the one or more features of the digital reference signature to the one or more features of the digital transaction signature, and send an authentication token to the acquirer once the digital transaction signature is verified; and
the acquirer configured to send the authentication token with an authorization request to an issuer.

2. The system of claim 1, the one or more features including a length feature, a time feature, an orientation feature, and an area feature.

3. The system of claim 2, wherein—
the length feature is based on a distance of a start point and an end point of a movement of a finger of the user when creating the digital reference signature and the digital transaction signature;
the time feature is based on a time spent creating the digital reference signature and the digital transaction signature;
the orientation feature is based on a physical orientation relative to gravity as well as a translational motion when creating the digital reference signature and the digital transaction signature; and
the area feature is based on a surface area covered by the digital reference signature and the digital transaction signature.

4. The system of claim 2, the one or more features further including a pressure change feature based on one or more changes in a pressure by the user when creating the digital reference signature and the digital transaction signature.

5. The system of claim 1, wherein the digital reference signature and the digital transaction are sent to and received by the rules engine in a hashed form.

6. The system of claim 1, wherein the rules engine is configured to store data for the one or more features of the digital reference signature in a signature vault for subsequent retrieval and use in verifying the digital transaction signature.

7. The system of claim 1, wherein the rules engine is configured to assign an acceptable range to each feature of the one or more features, and the digital transaction signature is verified when each feature of the one or more features of the digital transaction signature is within the acceptable range of the same feature of the digital reference signature.

8. A method for verifying a signature in real-time when authenticating a point-of-sale card-based transaction, the method comprising:
capturing a digital reference signature of a user on a mobile device of the user;
sending the digital reference signature from the mobile device to a rules engine;
evaluating one or more features of the digital reference signature by the rules engine;
determining that a power level of a point-of-sale terminal including a touchscreen is sufficient to capture a digital transaction signature of the user on the touchscreen so that one or more features of the digital transaction signature can be evaluated by the rules engine, and when the power level is not sufficient then initiating an alternative authentication method involving the user providing a personal identification number, and when the power level is sufficient then capturing a digital transaction signature of the user on the touchscreen of the point-of-sale terminal;

sending the digital transaction signature from the point-of-sale terminal to an acquirer;

sending the digital transaction signature from the acquirer to the rules engine;

evaluating one or more features of the digital transaction signature by the rules engine;

comparing the one or more features of the digital reference signature to the one or more features of the digital transaction signature by the rules engine to verify the digital transaction signature;

sending an authentication token from the rules engine to the acquirer once the digital transaction signature is verified by the rules engine; and sending the authentication token from the acquirer with an authorization request to an issuer.

9. The method of claim 8, the one or more features including a length feature, a time feature, an orientation feature, and an area feature.

10. The method of claim 9, wherein— the length feature is based on a distance of a start point and an end point of a movement of a finger of the user when creating the digital reference signature and the digital transaction signature;

the time feature is based on a time spent creating the digital reference signature and the digital transaction signature;

the orientation feature is based on a physical orientation relative to gravity as well as a translational motion when creating the digital reference signature and the digital transaction signature; and the area feature is based on a surface area covered by the digital reference signature and the digital transaction signature.

11. The method of claim 9, the one or more features further including a pressure change feature based on one or more changes in a pressure by the user when creating the digital reference signature and the digital transaction signature.

12. The method of claim 8, wherein the digital reference signature and the digital transaction are sent to and received by the rules engine in a hashed form.

13. The method of claim 8, further including assigning an acceptable range to each feature of the one or more features, and the digital transaction signature is verified when each feature of the one or more features of the digital transaction signature is within the acceptable range of the same feature of the digital reference signature.

14. The method of claim 8, further including storing the digital reference signature in a signature vault for subsequent retrieval and use in verifying the digital transaction signature by the rules engine.

15. A method for verifying a signature in real-time when authenticating a point-of-sale card-based transaction, the method comprising:

capturing a digital reference signature of a user on a mobile device of the user;

sending the digital reference signature in a hashed form from the mobile device to a rules engine;

evaluating a plurality of features of the digital reference signature by the rules engine, the plurality of features including— a length feature which is based on a distance of a start point and an end point of a movement of a finger of the user when creating the digital reference signature and the digital transaction signature;

a time feature which is based on a time spent creating the digital reference signature and the digital transaction signature;

an orientation feature which is based on a physical orientation relative to gravity as well as a translational motion when creating the digital reference signature and the digital transaction signature; and an area feature which is based on a surface area covered by the digital reference signature and the digital transaction signature;

assigning an acceptable range to each feature of the plurality of features;

determining that a power level of a point-of-sale terminal including a touchscreen is sufficient to capture the digital transaction signature of the user on the touchscreen so that one or more features of the digital transaction signature can be evaluated by the rules engine, and when the power level is not sufficient then initiating an alternative authentication method involving the user providing a personal identification number, and when the power level is sufficient then capturing a digital transaction signature of the user on the touchscreen of the point-of-sale terminal;

sending the digital transaction signature from the point-of-sale terminal to an acquirer;

sending the digital transaction signature in the hashed form from the acquirer to the rules engine;

evaluating a plurality of features of the digital transaction signature by the rules engine;

comparing the plurality of features of the digital reference signature to the plurality of features of the digital transaction signature by the rules engine to verify the digital transaction signature, wherein the digital transaction signature is verified when each feature of the one or more features of the digital transaction signature is within the acceptable range of the same feature of the digital reference signature;

sending an authentication token from the rules engine to the acquirer once the digital transaction signature is verified by the rules engine; and sending the authentication token from the acquirer with an authorization request to an issuer.

16. The method of claim 15, the plurality of features further including a pressure change feature which is based on changes in a pressure by the user when creating the digital reference signature and the digital transaction signature.

17. The method of claim 15, further including storing the digital reference signature in a signature vault for subsequent retrieval and use in verifying the digital transaction signature by the rules engine.

* * * * *